United States Patent
Palmer et al.

[11] Patent Number: 6,141,132
[45] Date of Patent: Oct. 31, 2000

[54] METHOD OF MODULATING A COHERENT LIGHT SOURCE WITH AN ELECTRONIC DIGITAL DATA STREAM

[75] Inventors: James R. Palmer, San Diego; Michael O'Hagan, La Jolla; Dmitry Berger; Harlan Faller, both of San Diego, all of Calif.

[73] Assignee: Silkroad, Inc., San Diego, Calif.

[21] Appl. No.: 09/241,688

[22] Filed: Feb. 2, 1999

[51] Int. Cl.[7] .............................. H04B 10/04; H04B 10/00
[52] U.S. Cl. ......................... 359/180; 359/181; 359/186; 359/161
[58] Field of Search .................................... 359/180, 181, 359/161, 173, 135, 179, 158, 156, 186

[56] References Cited

U.S. PATENT DOCUMENTS

| | | | |
|---|---|---|---|
| 4,289,373 | 9/1981 | Sugimotot et al. | 350/96.16 |
| 4,775,971 | 10/1988 | Bergmann | 370/3 |
| 5,473,458 | 12/1995 | Mamyshev et al. | 359/161 |
| 5,596,436 | 1/1997 | Sargis et al. | 359/132 |
| 5,757,529 | 5/1998 | Desurvire et al. | 359/179 |
| 5,831,752 | 11/1998 | Cotter et al. | 359/135 |
| 5,946,119 | 8/1999 | Bergano et al. | 359/124 |

OTHER PUBLICATIONS

Palmer, J.R., Steen, W.M., and Martellucci, S., Analytical Model For Aberrated Diffraction In High Power CW Laser Beam Trains: Laser Cavity To Work Piece, 238 Laser Applications For Mechanical Industry, 77–97, Kluwer Academic Publishers (1992).

Palmer, J.R., Continuous Wave Laser Damage On Optical Materials, 22–4 Optical Engineering, 435–446, (Jul./Aug. 1983).

*Primary Examiner*—Leslie Pascal
*Assistant Examiner*—Dalzid Singh
*Attorney, Agent, or Firm*—Welsh & Katz, Ltd.; Joseph R. Marcus; Jon P. Christensen

[57] ABSTRACT

A method and apparatus are provided for modulating a coherent light source with a digital) signal. The method includes the steps of splitting the digital signal into a first and a second copy and mixing the first copy with a clock signal to provide a first modulation component. The method further includes the steps of inverting the second copy and delaying the clock signal by one-hundred eighty degrees. The method also includes the steps of mixing the inverted second copy with the delayed clock signal to provide a second modulation component and summing the first and second modulation components.

26 Claims, 1 Drawing Sheet

METHOD OF MODULATING A COHERENT LIGHT SOURCE WITH AN ELECTRONIC DIGITAL DATA STREAM

FIELD OF THE INVENTION

The field of the invention relates to communication systems and more particularly to optical communication systems.

BACKGROUND OF THE INVENTION

The use of lasers for the transmission of information in communication systems is known. Such use has typically been limited to amplitude or phase modulated systems that in use often attain a speed of 1.5 gBPS.

Laser systems in current use for communications (e.g., a solid state pumped DFB 1550 nm lasers with 100 mW output available for fiber optic communication system from Laser Power Corp., San Diego, Calif.) are typically amplitude modulated because of certain inherent limitations in a laser's ability to change frequency. Lasers, in fact, are often limited to a single frequency or a narrow range of frequencies (typically ±60 kHz). The ability of a laser to produce a stable optical carrier frequency is inherent in the resonant cavity used in the generation of laser signals.

A resonant cavity of a laser is designed to amplify optical signals of a desired frequency and attenuate signals of an undesired frequency. The cavity amplifies desired frequencies through use of a laser cavity dimensioned in one-quarter wavelength increments. The closer the cavity dimensions are to a desired tolerance, the narrower the range of frequencies within which the laser will operate (the linewidth). The narrower the linewidth, the less inherent phase noise will be transmitted in a laser signal. Further, the narrower the linewidth, the more power is focused into a desired center frequency.

While amplitude or intensity modulation is the predominant mode of data transmission, some progress has been made by using a combination of AM modulation and multiplexing. For example, systems have been proposed using subcarrier multiplexing (SCM) of the laser beam as an alternative (e.g., Goviad P. Agrawal, *Fiber Optic Communications Systems,* 2nd Ed., Wiley Series in Microwave and Optical Engineering, Kai Chang, Series Editor, Chapter 7, Section 7.5, pgs 335–345, John Wiley & Sons, Inc. New York 1997 ISBN 0-471-7540-4; Leonid Kazovsky, Sergio Benedetto and Alan Willner, *Optical Fiber Communications Systems,* Arttech House, Inc., Norwood, Mass., 1996, ISBN 0-89-006-756-2, Chapter 4, Sections 4, 4.1, 4.2 and 4.3; etc.).

Because a laser is essentially a resonant cavity, it tends to resist changes in frequency. Direct amplitude modulation by current injection has been the preferred method used in prior systems, thus modulating the laser beam at its source. This has proven only partially successful because of a tendency of the resonant cavity to exclude frequencies outside a low bandwidth regime. Direct AM modulation is typically limited to an information block of less than 1.5 GHz in spectral bandwidth. Because of the importance of optical communications systems a need exists for improved methods of optical modulation.

SUMMARY

A method and apparatus are provided for modulating a coherent light source with a digital signal. The method includes the steps of splitting the digital signal into a first and a second copy and mixing the first copy with a clock (subcarrier) signal to provide a first modulation component. The method further includes the steps of inverting the second copy and delaying the clock signal by one-hundred eighty degrees. The method also includes the steps of mixing the inverted second copy with the delayed clock signal to provide a second modulation component and summing the first and second modulation components. The method also includes a means of extracting the embedded clock (subcarrier) signal at the receiving end for use in heterodyning the received information signal block back to a base band.

DETAILED DESCRIPTION OF THE PREFERRED EMBODIMENT

Figure 1:
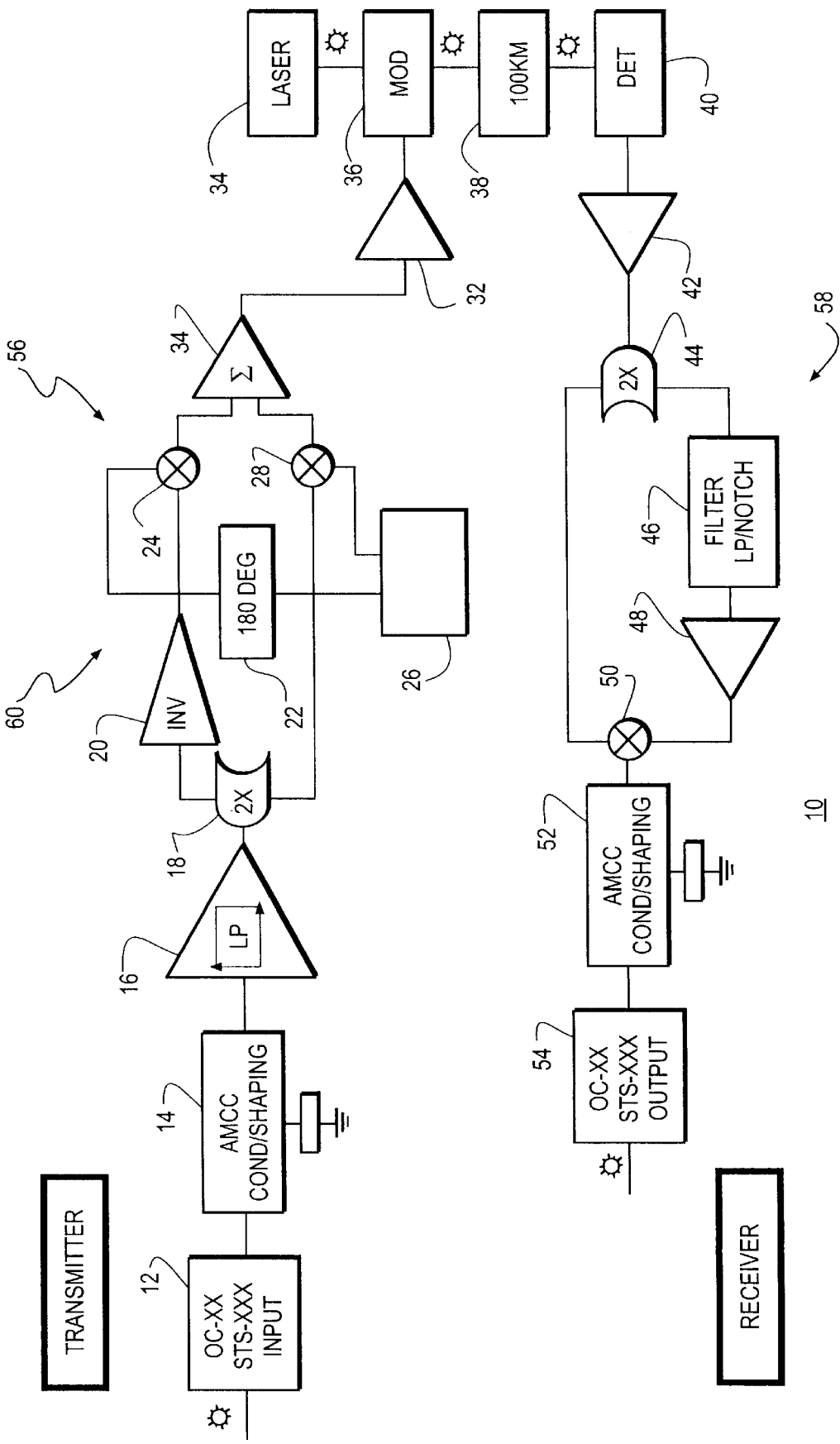
FIG. 1 is a block diagram of a system for modulating a coherent light source in accordance with an illustrated embodiment of the invention.

FIG. 1 is a block diagram of a laser transmission system 10, generally, in accordance with an illustrated embodiment of the invention. As shown, a transmitter 56 located on a first end of the transmission system receives an information signal (e.g., encoded under an OC-XX or STS-XX format), encodes the information signal and transmits the encoded signal over a fiber optics cable 38 to a receiver 58. within the receiver 58, the encoded signal is decoded and the information signal recovered.

While it has been found that the transceiver (i.e., a transmitter/receive combination made up of the transmitter 56 and receiver 58) is transparent to the format of the information signal, the transceiver 56, 58 has been found to work particularly well with the OC-XX or STS-XX Synchronous Optical Network (SONET) formats. For instance an information signal provided under the OC-3 (STS-3) format at 155 Mb/s has been found to work well in the transceiver 56, 58, as has the OC-12 (STS-12) format at 622 Mb/s. The system 10 has also been found to work well with the OC-48 (STS48) format at 2.5 Gb/s or the OC-192 (STS-192) format at 10 Gb/s.

Creating a symmetric waveform removes the DC bias component of the signal. This is accomplished in the transmitter 56 by splitting the incoming low-pass (LP) filtered and amplified signal into first and second copies, inverting the first copy, mixing the second copy with a clock signal from a VCO 26, mixing the inverted first copy with a 180 degree delayed version of the clock signal and summing the mixed second copy and clock with the mixed inverted first copy and delayed clock. The LP filtering and amplification encompasses the entire frequency range from DC up to the fundamental frequency of the data signal. No upper harmonics from the data signal remain after the LP filtering and amplification, thus narrowing the required optical fiber spectral bandwidth necessary for transmission.

In general, the transmitter 56 functions by compressing the bandwidth required by a conventional optical signal modulated by the OC-XX or STS-XX signal. The transmitter accomplishes compression by low-pass filtering and thereby eliminating the fundamental frequency of the digital pulses in the information signal. The filtered pulses received under the OC-XX or STS-XX are then formed into a conventional sine wave for modulation of the laser 34 in a laser modulator 36.

Under the illustrated embodiment, the OC-XX, STS-XX input device 12 may be used as an adapter between the two formats. Where the information signal is an optical signal under the OC-XX format, the device 12 may be a high-speed PIN photonic detector (e.g., a photodetector). Where the information signal is in the radio frequency range under a comparable radio frequency (rf) format, the device 12 may be a unity-gain amplifier.

Following conversion of the OC-XX signal into an rf signal (or performing a similar transformation on the STS-XX signal directly), the information signal is shaped in an AMCC cond/shaping circuit 14 (e.g., Part No. 53026A, manufactured by Applied MicroCircuits Corp.). LP filtering may be performed to reduce unwanted harmonics and extraneous high-frequency noise.

Following the shaping of the OC-XX or STS-XX signal, the shaped signal is low-pass filtered and amplified. For example in the case of a OC-12 signal, low-pass filtering may be performed with a cut-off frequency of no more than 10 MHz above that of the data frequency of 622 MHz.

From the low-pass filter 16, the shaped, filtered and amplified information signal is processed in a signal divider 18 into two signals. An appropriate amplification factor (e.g., 2) may also be introduced within the signal divider 18 to maintain a good signal to noise ratio.

Following signal division, one output of the signal divider 18 is inverter in an inverter 20. Since the output of the previously discussed signal divider 18 is either a positive value or zero, the result of the inversion in the inverted 20 is a series of negative-going pulses.

Following inversion of one of the divided signals, the two signals are frequency upshifted within multipliers 24, 28 using a clock (subcarrier) signal from a voltage controlled oscillator (VCO) 26. While the positive, component signal is multiplied directly in a first multiplier 28, the inverted divided signal is multiplied by a phase delayed version of the clock (subcarrier) signal from the VCO 26.

The VCO 26 may be any tunable, but stable high frequency reference (e.g., a quartz crystal VCO, PLO, DRU) and one or more frequency multipliers to generate a reference frequency from a base frequency. For example, phase-locked loop (PLLs) frequency multipliers are known which use integer dividers in a feedback path and a VCO in a feedforward path to generate stable multiples of a base clock frequency. Alternatively, fractional frequency dividers using sigma-delta modulation of the feedback divider may be used for the generation of sub-integer multiples of the base frequency.

Multiplication within the multiplier 28 of the positive, divided signal from the divider 18 by the clock signal results in the output of a positive-going pulse whenever the information signal is at a high level. The multiplied positive pulse is transferred to a summer 30.

The phase delay introduced within the phase delay device 22 is substantially equal to 180 degrees. The phase delay device 22 may be any appropriate phase-shifting device (e.g., pulse delay timer, capacitor/pulse shaping devise, etc.).

Since the phase delayed clock signal is offset by 180 degrees, the phase delayed clock pulses are non-coincident (i.e., 180 degrees out of phase) with the non-delayed clock pulses. Further, since the phase delayed clock pulses are multiplied by a negative-going information signal, the output of the second multiplier 24 is a series of negative-going pulses. When each positive-going pulse from the first multiplier 28 is summed with a delayed negative-going pulse from the second multiplier 24, the result is an approximation of one cycle of a sine wave. The net result of the summation is that whenever a positive value is present on the input of the divider 18, a sine wave at the clock frequency of the VCO 26 is present at the output of the summer 30 and is ultimately applied to the laser modulator 36. Whenever a zero value is present on the input to the divider 18, a zero value is applied to the modulator 36.

Selection of a clock (subcarrier) frequency for the VCO 26 is dependent upon a clock frequency of the OC-XX or STS-XX signal. To ensure sufficient sampling, the clock frequency of the VCO 26 would be expected to be at least twice (and preferably 2½ times) the clock frequency of the OC-XX or STS-XX signal, as required by the Nyquist theorem. For example, in the case of an OC-12 signal with a 622 MHz data clock a minimum clock (subcarrier) frequency of 2.9 GHz may be selected.

The laser modulator 36 may be any electro-optical device capable of modulating an optical signal with a controlling electrical signal through refractive synchronization. For example lithium niobate (LiNbO$_3$) or gallium arsenide (GaAs) crystals are known to have such characteristics. SuitaDle devices for use with the modulator 36 include those devices with a suitable radio frequency (RF) interface and internal laser source or optical interface for an external laser source (e.g., a Marconi Model Lt 7000 with External Modulator, External Modulator by UTP SITU, Marconi LC 1000, etc.).

Optical refractive synchronization is a process whereby a controlling clock subcarrier and information signal are used to modulate in optical signal. Fundamentally, the process of refraction is the change of energy, direction or speed of a light beam which is propagating through a medium. In a first case, the change in direction may be a continuous bending of the light beam and of the subsequent change of the speed of light in the medium which is referred to as the index of refraction of the material. In a second case, there is an abrupt change in the index, polarity, or phase of the medium which directs the energy out of the medium, or changes the ability of light to pass through the medium, thereby absorbing the energy. This second case is the technique employed in optical refractive synchronization. The light is passed through a crystal which has the refractive index changed abruptly, by imposition of an electric field, by passing a controlling signal through the crystal, which then causes the crystal to allow the light to pass through, or be absorbed in the crystal at the frequency of the controlling signal. This optical modulation is performed, therefore, through control of the refraction and polarization signal of the optical crystal.

By applying the output of the summer 30 through the amplifier 32 to the modulator 36, the coherent light output of the laser 34 is effectively modulated by the sampled information signal. The modulated laser beam may then be transmitted to a distant receiver 58 over an intervening fiber optic cable 38.

Within the receiver 58, the modulated laser beam is first detected in an appropriate photonic detector (e.g., photodetector) 40. Following detection, the detected signal may be amplified within an amplifier 42 and applied to another splitter 44.

Within the splitter 44, the detected amplified signal may be divided into a pair of identical signals. The signals at this point are still modulated by the original information signal and the clock signal from the VCO 26. The first of the pair of identical signals is applied to a notch filter 46.

The notch filter 46 functions to recover the clock signal provided by the VCO 26. The notch filter 46 does this by passing frequencies within the notch (i.e., the clock (subcarrier) frequency) and attenuating frequencies outside of the notch. The notch filter would be expected to have an appropriate bandwidth tailored to the application (e.g., 5 MHz). Once isolated, the recovered clock (subcarrier) signal is amplified in an amplifier 48 and mixed with the second of the pair of identical signals in a mixer 50.

Mixing the recovered (subcarrier) clock signal with the second signal in the mixer 50 effectively recovers the information signal. For example, mixing two signals together provides sum and difference signals. Mixing the recovered (subcarrier) clock with the detected signal (containing the (subcarrier) clock with a superimposed information signal) results in a summation signal (i.e., two times the clock (subcarrier), plus the information signal) and a difference signal (i.e., the information signal). Since the summation signal lies at a relatively high frequency, it may be easily attenuated.

To further enhance reproduction of the originally encoded signal, the recovered signal is shaped in another AMCC Cond/Shaping circuit 52 (e.g., manufactured by Applied MicroCircuits Corp., Part No. 53026A). Following shaping, the signal may be converted back to an original format.

The OC-XX, STS-XX Output 54 functions to convert the signal back to its original format. Where the original signal was input as a STS-XX signal the Output 54 may be a unit gain amplifier. Where the original signal was an OC-XX the Output may be a laser modulated by the recovered signal.

A specific embodiment of a method and apparatus for modulating a coherent light beam according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of modulating a coherent light source with a digital signal, such method comprising the steps of:
    splitting the digital signal into a first and a second copy;
    mixing the first copy with a clock signal to provide a first modulation component;
    inverting the second copy;
    delaying the clock signal by one-hundred eighty degrees;
    mixing the inverted second copy with the delayed clock signal to provide a second modulation component; and
    summing the first and second modulation components.

2. The method of modulating as in claim 1 further comprising defining the digital signal as being one of a synchronous transport signal (STS-n) or an optical carrier level n (OC-n) signal.

3. The method of modulating as in claim 2 further comprising low-pass filtering the STS-n or OC-n signal in advance of splitting.

4. The method of modulating as in claim 3 wherein the step of low-pass filtering further comprises providing a filter cut-off frequency at substantially 100 MHz above a bit rate of the STS-n or OC-n signal.

5. The method of modulating as in claim 1 further comprising defining the STS-n or OC-12 signal, as being of a level 12 format, operating substantially at 622 Mbits/second.

6. The method of modulating as in claim 5 further comprising defining the clock (subcarrier) frequency at substantially 2.9 Gbits/second.

7. The method of modulating as in claim 1 further comprising defining the coherent light source as a laser beam.

8. The method of modulating as in claim 7 further comprising modulating the laser beam with the summed first and second modulation components.

9. The method of modulating as in claim 8 wherein the step of modulating the laser beam further comprises refractively synchronizing the laser beam with the summed first and second modulation components.

10. The method of modulating as in claim 9 wherein the step of refractively synchronizing the laser beam further comprises routing the laser beam through a lithium niobate crystal.

11. The method of modulating as in claim 9 wherein the step of refractively synchronizing the laser beam further comprises applying the summed first and second modulation components to an RF input of the lithium niobate crystal.

12. Apparatus for modulating a coherent light source with a digital signal, such apparatus comprising:
    means for splitting the digital signal into a first and a second copy;
    means for mixing the first copy with a clock signal to provide a first modulation component;
    means for inverting the second copy;
    means for delaying the clock signal by one-hundred eighty degrees;
    means for mixing the inverted second copy with the delayed clock signal to provide a second modulation component; and
    means for summing the first and second modulation components.

13. The apparatus for modulating as in claim 12 further comprising means for providing the digital signal under one of a synchronous transport signal, level n, (STS-n) format or an optical carrier level n (OC-n) signal format.

14. The apparatus for modulating as in claim 13 further comprising means for low-pass filtering the STS or OC-n signal in advance of splitting.

15. The apparatus for modulating as in claim 14 wherein the means for low-pass filtering further comprises means for providing a filter cut-off frequency at substantially 10 MHz above a data frequency of the STS-n or OC-n signal.

16. The apparatus for modulating as in claim 12 further comprising means for defining the STS-n or OC-n signal, as being of a level 12 format, operating sub stantially at 622 Mbits/second.

17. The apparatus for modulating as in claim 16 further comprising means for defining the clock frequency at substantially 2.9 Gbits/second.

18. The apparatus for modulating as in claim 17 further comprising means for modulating the laser beam with the summed first and second modulation components.

19. The apparatus for modulating as in claim 18 wherein the means for modulating the laser beam further comprises means for refractively synchronizing the laser beam with the summed first and second modulation components.

20. The apparatus for modulating as in claim 19 wherein the means for refractively synchronizing the laser beam further comprises means for routing the laser beam through a lithium niobate crystal.

21. The apparatus for modulating as in claim 19 wherein the means for refractively synchronizing the laser beam further comprises means for applying the summed first and second modulation components to an RF input of the lithium niobate crystal.

22. Apparatus for modulating a coherent light source with a synchronous transport signal (STS-n) or an optical carrier level n (OC-n) signal, such apparatus comprising:

a signal splitter adapted to split the STS-n or OC-n signal into a first and a second copy;

a first mixer adapted to mix the first copy with a clock signal to provide a first modulation component;

an inverter adapted to invert the second copy;

a phase delay device adapted to delay the clock signal by one-hundred eighty degrees;

a second mixer adapter to mix the inverted second copy with the delayed clock signal to provide a second modulation component; and a summer adapted to sum the first and second modulation components.

23. The apparatus for modulating as in claim 22 further comprising a low-pass filter adapted to filter the STS-n or OC-n signal in advance of splitting.

24. The apparatus for modulating as in claim 23 wherein the low-pass filter further comprises a low-pass filter with filter cut-off frequency at substantially 10 MHz above a bit rate of the STS-n or OC-n signal.

25. The apparatus for modulating as in claim 23 further comprising a modulator adapted to modulate the laser beam with the summed first and second modulation components.

26. The apparatus for modulating as in claim 23 wherein the modulator further comprises a lithium niobate crystal adapted to refractively synchronize the laser beam with the summed first and second modulation components.

* * * * *